(12) United States Patent
Huang et al.

(10) Patent No.: US 7,852,242 B2
(45) Date of Patent: Dec. 14, 2010

(54) INCREASING 8B/10B CODING SPEED USING A DISPARITY LOOK-AHEAD TABLE

(75) Inventors: Wen-Hung Huang, Hsin-Chu (TW); Yung-Chow Peng, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 272 days.

(21) Appl. No.: 12/121,509

(22) Filed: May 15, 2008

(65) Prior Publication Data
US 2009/0315743 A1 Dec. 24, 2009

(51) Int. Cl.
*H03M 7/00* (2006.01)
(52) U.S. Cl. .......................... 341/106; 341/58
(58) Field of Classification Search .............. 341/58, 341/106
See application file for complete search history.

(56) References Cited

U.S. PATENT DOCUMENTS

| | | | | |
|---|---|---|---|---|
| 4,486,739 A | * | 12/1984 | Franaszek et al. | ............ 341/59 |
| 6,188,337 B1 | * | 2/2001 | Soljanin | ...................... 341/59 |
| 6,501,396 B1 | * | 12/2002 | Kryzak et al. | ................. 341/59 |
| 6,606,328 B1 | * | 8/2003 | Susnow | ...................... 370/465 |
| 7,061,407 B1 | | 6/2006 | Lee | |

OTHER PUBLICATIONS

Widmer, A. X., et al., "A DC-Balanced, Partitioned-Block, 8B/10B Transmission Code," IBM Journal of Research and Development, Sep. 1983, vol. 27, No. 5, pp. 440-451.

* cited by examiner

*Primary Examiner*—Khai M Nguyen
(74) *Attorney, Agent, or Firm*—Slater & Matsil, L.L.P.

(57) ABSTRACT

A method for encoding data packets includes providing an encoding scheme for coding source data units into encoded data units; establishing a first look-ahead table for the source data units; providing a data packet including a first source data unit and a second source data unit; encoding the first source data unit to generate a first encoded data unit; indexing the first look-ahead table using the first source data unit to determine a balancing capability of the first encoded data unit for balancing a running disparity; and encoding the second source data unit to generate a second encoded data unit using the balancing capability of the first encoded data unit.

32 Claims, 3 Drawing Sheets

INCREASING 8B/10B CODING SPEED USING A DISPARITY LOOK-AHEAD TABLE

TECHNICAL FIELD

This invention relates generally to encoding/decoding in communications, and more particularly to improving the speed of disparity-related coding, and even more particularly to 8B/10B encoding/decoding.

BACKGROUND

Many communication protocols use data that are encoded using an 8b/10b encoding scheme. The 8b/10b encoding scheme is designed for encoding 8 bits of data into 10 bits of encoded data. In addition to encoding data, the 8b/10b encoding scheme permits a limited number of control characters to be encoded. For each of the 256 possible values for 8 bits of data and each of the typically 12 possible control characters, the 8b/10b encoding scheme has one, or a pair of, corresponding 10 bit encodings.

The 8b/10b encoding scheme permits the data and control codes to be communicated over communication media in a manner that is band-limited and run-length limited. The communication media may be copper cable, fiber optic cable, or traces on a printed circuit board.

The 8b/10b encoding scheme is band limited because the frequency components of a signal encoded using the 8b/10b encoding scheme are limited to a band of frequencies, and this band of frequencies does not include a DC component. The band limiting may reduce the distortion of the signal by the communication media due to dispersion of the various frequency components. The lack of a DC component may permit capacitive coupling of the signal.

The limited run-length and associated high transition density of the 8b/10b encoding scheme may permit a phase locked loop, or a clock and data recovery circuit (CDR), to recover from a received signal the clock used to transmit the signal. Because a separate clock signal is not needed, the 8b/10b encoding scheme may reduce the number of signals needed to transmit data over a communication media.

Conventionally, an 8-bit data unit may be divided into a 3-bit data unit and a 5-bit data unit. The 3-bit data unit is encoded into a 4-bit encoded data unit, and the 5-bit data unit is encoded into a 6-bit encoded data unit. The 4-bit encoded data unit and the 6-bit encoded data unit are then combined into a 10-bit data unit. Various encoding schemes have been proposed to implement the 8b/10b encoding. It is desirable that after the 8b/10b encoding, the resulting data stream does not have more than five "1"s or more than five "0"s. It is more desirable that the running disparity, which indicates the difference between the number of "1"s and the number of "0"s, is balanced. That is, if a 10-bit data unit has a positive or negative disparity, the following 10-bit data unit preferably has a negative or positive disparity, respectively, so that the overall disparity is balanced, and the DC component of the transmitted data is substantially eliminated. An example of a conventional 8b/10b encoding scheme is discussed in an article by A. X. Widmer, et al., entitled "A DC-Balanced, Partitioned-Block, 8B/10B Transmission Code," which article is incorporated herein by reference, and is referred to as Widmer hereinafter.

In the conventional data encoding schemes, since the encoding of an 8-bit data unit preferably balances the disparity in the previous 8-bit data units, the encoding of each data unit has to depend on the encoding results of the previous data units. Therefore, the encoding of an 8-bit data unit cannot start before the previous 8-bit data unit has been encoded, and the running disparity is known. This significantly reduces the encoding speed. The situation is further worsened since even inside the encoding of an 8-bit data unit, which includes a 5b/6b coding and a 3b/4b encoding, the encoding of the later one has to wait until the disparity of the earlier one is known before it can be encoded. Therefore, for a 16-bit data unit, which may be divided into a first 5-bit data unit, a first 3-bit data unit, a second 5-bit data unit, and a second 3-bit data unit, beginning the encoding of the first 3-bit data unit has to be postponed until the encoding of the first 5-bit data unit is completed. Similarly, the second 3-bit data unit cannot begin being encoded until the encoding of the first 3-bit data unit is finished. The encoding of the second 3-bit data unit has to wait for all previous encodings to be completed. New encoding schemes for improving the encoding speeds are thus needed.

SUMMARY OF THE INVENTION

In accordance with one aspect of the present invention, a method for encoding data packets includes providing an encoding scheme for coding source data units into encoded data units; establishing a first look-ahead table for the source data units; providing a data packet including a first source data unit and a second source data unit; encoding the first source data unit to generate a first encoded data unit; indexing the first look-ahead table using the first source data unit to determine a balancing capability of the first encoded data unit for balancing a running disparity; and encoding the second source data unit to generate a second encoded data unit using the balancing capability of the first encoded data unit.

In accordance with another aspect of the present invention, a method for encoding data packets includes providing an encoding scheme for 8b/10b encoding, wherein at least one 8-bit source data unit corresponds to two 10-bit encoding choices having opposite disparities; establishing a first look-ahead table including 8-bit source data as a first column, wherein a second column of the first look-ahead table represents balancing capabilities of 10-bit encodings generated from the 8-bit source data; providing a data packet including a first source byte and a second source byte; encoding the first source byte to generate a first 10-bit encoded data unit; indexing the first look-ahead table using the first source byte to determine a first balancing capability of the first 10-bit encoded data unit for balancing a running disparity; before the step of encoding the first source byte is finished, encoding the second source byte to generate a second 10-bit encoded data unit using the running disparity and the first balancing capability; and combining the first and the second 10-bit encoded data units into an additional data packet.

In accordance with yet another aspect of the present invention, a method for encoding data packets includes providing a running disparity; providing a data packet including a first source byte and a second source byte; encoding the first source byte to generate a first 10-bit encoded data unit; and, before the first 10-bit encoded data unit is generated, encoding the second source byte to generate a second 10-bit encoded data unit. The step of encoding the first source byte is started before the first 10-bit encoded data unit is generated.

In accordance with yet another aspect of the present invention, an encoding system includes a first look-ahead table indexing source data units to balancing capabilities, wherein each of the balancing capabilities indicates a capability of an encoded data unit generated from a respective source data unit for balancing running disparities; a first encoder configured to encode a first source data unit in a data packet to generate a first encoded data unit; and a second encoder configured to encode a second source data unit in the data packet to generate a second encoded data unit, wherein the second encoder is configured to index into the first look-ahead table using the first source data unit.

In accordance with yet another aspect of the present invention, an encoding system includes a look-ahead table indexing bytes to balancing capabilities; a first 8b/10b encoder configured to encode a first source byte in a data packet to generate a first 10-bit encoded data unit, and to balance a running disparity; and a second 8b/10b encoder configured to encode a second source byte in the data packet to generate a second 10-bit encoded data unit, and to balance the running disparity. The second 8b/10b encoder is configured to predict the running disparity by indexing the first source byte in the look-ahead table.

By using the embodiments of the present invention, the encoding/decoding speed may be increased significantly.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
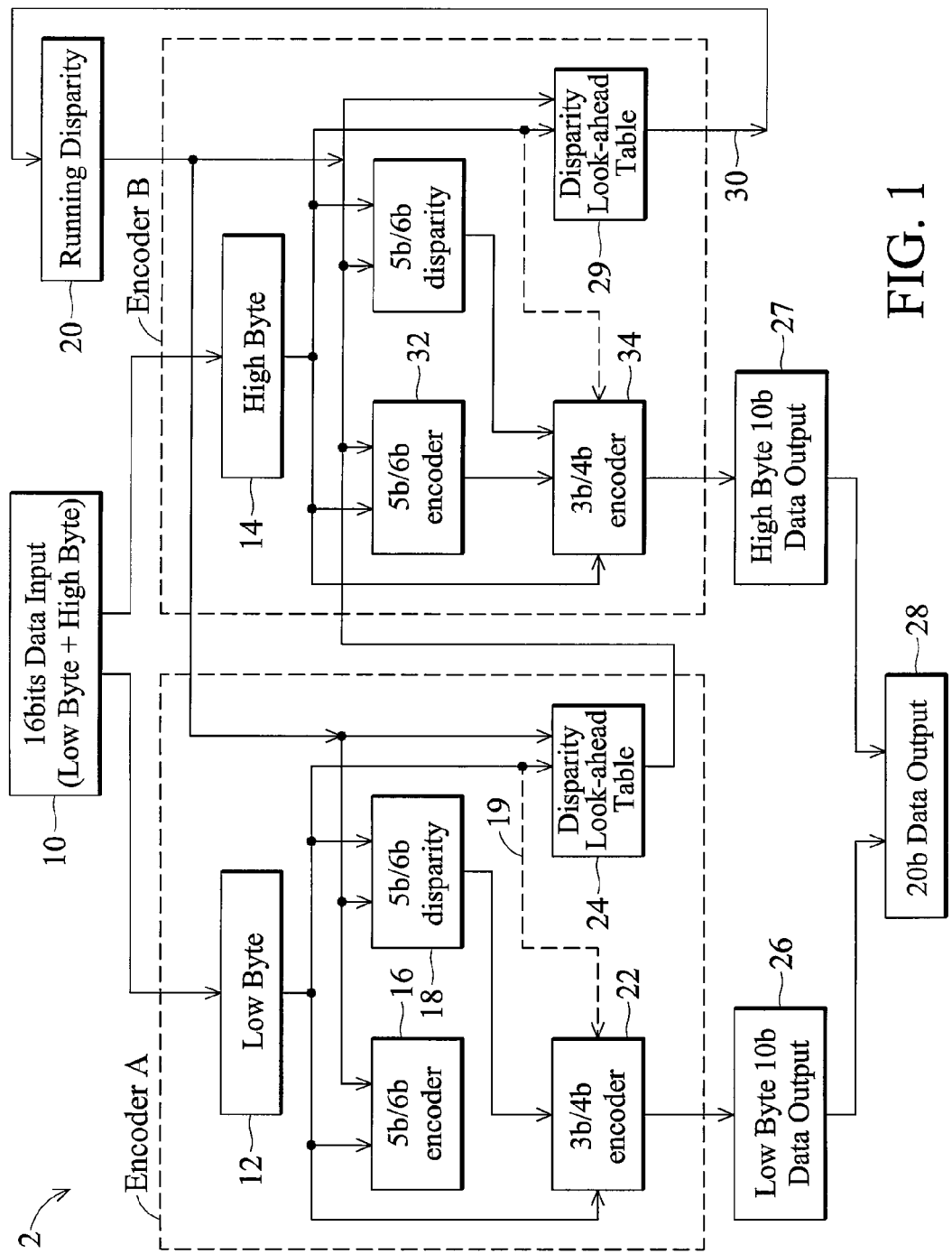
FIG. 1 illustrates an embodiment of the present invention, wherein two bytes in a data packet are encoded simultaneously.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In modern communications, data are often transferred as data packets, variable in length, from one byte to more than several hundred bytes. To ensure that the clock and data recovery (CDR) circuits can correctly recover the clock and data from the received packets, it is preferred that the numbers of continuous "1"s and "0"s in the transmitted data are low, for example, less than about 5. Disparity is used to measure how balanced a data packet or a byte is, wherein the disparity represents the number of "1"s over, or less than, the number of "0"s. In an embodiment, a positive disparity indicates the byte/packet has more "1"s than "0"s, and a negative disparity indicates the byte/packet has fewer "1"s than "0"s. In an exemplary embodiment, a byte of "10011011" has a disparity of +2 since it has two more "1"s than "0"s. A running disparity is used to measure the overall disparity on the transmission line at a certain time point, and the running disparity changes with time. It is desirable that the running disparity is as balanced (equal to zero) as possible, although at any time, the running disparity may also be positive or negative. Accordingly, if the running disparity is unbalanced, the next data unit will be encoded in such a way to balance the running disparity. For example, if the existing running disparity is +2, then the next byte is preferably encoded as having a disparity of −2, so that the running disparity becomes 0.

In the embodiments provided in the following paragraphs, the encoding of bytes is discussed to explain the concept of the present invention. Further, in the byte encoding, each source byte (8 bits) is divided into a 5-bit source data unit and a 3-bit source data unit, and the source data units are then individually encoded (referred to as 5b/6b encoding and 3b/4b encoding, respectively) to generate a 6-bit encoded (data) unit and a 4-bit encoded (data) unit. The 6-bit and 4-bit encoded units are then combined to generate a 10-bit encoded unit, which may be transmitted through a transmission media. The encoding scheme is designed such that the disparity of the resulting 10-bit coding only has three possibilities, +2, 0, and −2, and the number of continuous "1"s or "0"s of the data stream is less than 6. In an exemplary embodiment, the 3b/4b encoding and 5b/6b encoding may adopt the method discussed in the Widmer reference. However, one skilled in the art will realize that since the 4b encoding has twice as many possible encoding choices as the 3b encoding, and the 6b encoding has twice as many possible encoding choices as the 5b encoding, the 3b/4b and 5b/6b encoding may adopt different encoding schemes than the one provided by Widmer.

In a selected coding scheme, for each byte the resulting 10-bit encoded data unit may have only one encoding choice, for example, "10100101" can only be encoded as "10100011010." Some other bytes, for example, "00010101," may have two encoding choices such as "0001101010" and "1110011010." These encoding choices may have a balanced disparity, with 5 "1" bits and 5 "0" bits each, or have one with a positive disparity, and one with a negative disparity. Accordingly, a byte, after being encoded, may have the ability to balance the running disparity if the running disparity is unbalanced. The encoded data units are capable of balancing the running disparity only if one of the two encodings has a positive disparity, and the other has a negative disparity. Conversely, a byte, after being encoded, does not have the ability to balance the disparity if there is only one encoding choice for the byte.

In the embodiments of the present invention, an encoding system of the present invention includes a disparity look-ahead table. Table 1 illustrates a starting portion of an exemplary look-ahead table.

TABLE 1

| Data Units | Balancing Capability |
|---|---|
| 00000000 | 0 |
| 00000001 | 0 |
| 00000010 | 0 |
| 00000011 | 1 |
| 00000100 | 0 |
| 00000101 | 1 |
| 00000110 | 1 |

The first column of the table shows the source data units (also referred to as source data bytes), and the second column (balancing capability) is filled with a "0" or a "1" to indicate the balancing capability of the encoded data units generated from the respective data units for balancing the running disparity. Each of the possible data units is represented by one row. Accordingly, Table 1 has 256 rows for representing all possible data units of a byte. As discussed in the preceding paragraphs, if the 10-bit encoded data is balanced, or there is only one encoding choice, a "0" is filled into the second column of the respective data unit, indicating the 10-bit encoded data of this source byte does not have the ability to balance the running disparity. Conversely, if a byte has two 10-bit encoding choices, with one having a positive disparity, and the other having a negative disparity, a "1" is filled into the second column, indicating the 10-bit encoded data unit has the ability to balance the running disparity. In this case, the 10-bit encoding choice having an opposite disparity to the unbalanced running disparity will be selected. The look-ahead tables are pre-generated and are static. At the encoding time, the encoders only need to index into the look-ahead tables using the source data byte to find the balancing capabilities.

In other embodiments of the present invention, the source data units in the first column of the look-ahead table may have five bits or three bits. Correspondingly, the look-ahead table indicates whether the 6-bit encodings corresponding to the 5-bit data units (or a 4-bit encoding corresponding to the 3-bit data unit) have the ability of balancing the running disparity or not.

FIG. 1 illustrates an embodiment of the present invention, which includes encoding system 2 for encoding a source data packet including two bytes, referred to as a low byte and a high byte. It is assumed the low byte is transmitted earlier than the high byte. Each block in FIG. 1 represents a functional unit, such as an encoder, and the corresponding step performed by the functional unit. In an exemplary encoding, the low byte and the high byte are first separated (blocks 10, 12 and 14). The low byte is separated into a 5-bit data unit and a 3-bit data unit (blocks 16 and 18/22). In an embodiment, the 5-bit data unit is encoded first (block 16). The encoding needs to take into consideration the running disparity (block 20), and hence encoder 16 tries to generate a 6-bit encoded data unit that balances the running disparity. However, the 6-bit encoded data unit may, or may not, have the ability to balance the running disparity. If the 6-bit encoded data unit has the ability to balance the running disparity, then the 4-bit encoded data unit corresponding to the 3-bit data unit is preferably balanced. Otherwise, the 4-bit encoded data unit preferably balances the running disparity.

In an embodiment, whether the 6-bit encoded data unit has balanced the running disparity or not can be determined from a 5-bit look-ahead table, and hence the encoding of the 3-bit data unit (block 22) does not have to wait for the encoding of the 5-bit data unit to finish (refer to dashed line 19). In alternative embodiments, the encoding of the 3-bit data unit is started after the encoding of the 5-bit data unit finishes and the disparity of the 6-bit encoded data unit is known. After the encodings of both the 5-bit data unit and the 3-bit data unit finish, a 10-bit data unit is generated by combining the 6-bit encoded data unit and the 4-bit encoded data unit (block 26).

An advantageous feature of the present invention is that the encoding (referred to as parallel encoding hereinafter) of the high byte does not have to wait for the encoding of the low byte to finish and for the disparity of the low byte to be known. Referring to block 14, at the time the low byte is encoded, the encoder 32 knows what the high byte is, and what the running disparity carried over from the previous source data packet (block 20) is. The only information encoder 32 (and possibly encoder 34) needs to know before it can start encoding the high byte is whether the 10-bit encoded data unit of the low byte has balanced the running disparity or not. This information is provided in the look-ahead table, for example, look-ahead Table 1. Accordingly, the encoders 32 and 34 may perform the encoding of the high byte simultaneously with the encoding of the low byte.

Referring to block 20, if the running disparity is unbalanced, and the "balancing capability" of the low byte in the look-ahead table is "1," indicating the low byte has the ability to balance the running disparity, encoders 32 and 34 can assume the running disparity received by the high byte will be balanced, and encoders 32 and 34 will try to generate a balanced 10-bit encoded data unit from the high byte, or they may randomly select an encoding from the two encoding choices. Otherwise, if the low byte value in the look-ahead table has a value of "0," encoders 32 and 34 will assume the running disparity received by the low byte will be passed to the high byte without being changed, and encoders 32 and 34 will try to generate a 10-bit encoded data unit from the high byte, which 10-bit encoded data unit balances the unbalanced running disparity shown in block 20.

After the encoding system 2 has encoded both the low byte and the high byte, the 10-bit encoded data unit (block 27) generated from the high byte is combined with the 10-bit encoded data unit (block 26) generated from the low byte to generate a 20-bit data (block 28) by a combiner, which is also represented by block 28. The running disparity after the encoding of the high byte is used for the encoding of the next 16-bit data (arrow 30).

In FIG. 1, the encoding of the low byte and the high byte is performed by encodes A and B, respectively. In the illustrated example, encoders A and B, such as 8b/10b decoders, have the functions of separating the 8 bits into a 3-bit data unit and a 5-bit data unit, checking the look-ahead table, and invoking 3-bit encoders 22 and 34 and 5-bit encoders 16 and 32. The running disparity may be recorded (arrow 30) using a running-disparity register (step 20).

By using the scheme illustrated in FIG. 1, the encoding time for 16-bit data packets can be significantly reduced. Simulation results have revealed the speed for encoding 16-bit data packets has been improved by about 26 percent (from about 475 MHz to about 600 MHz). The integrated circuits for implementing the encoders of the present invention, however, only use about 5 percent more chip area than conventional encoders having no look-ahead ability.

Figure 2:
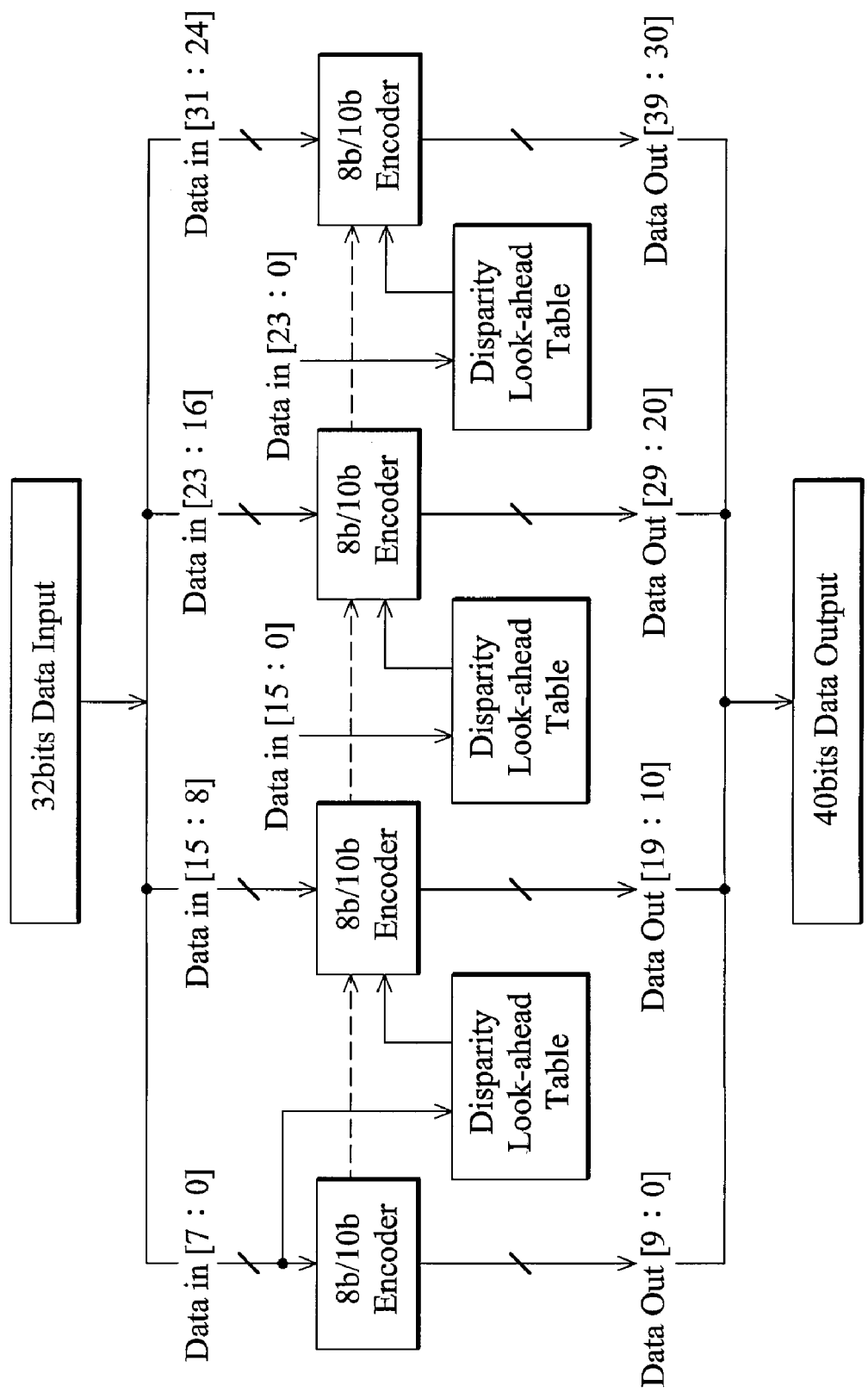
FIG. 2 illustrates an alternative embodiment of the present invention, wherein four bytes in a data packet are encoded simultaneously.

It is realized that the embodiments of the present invention may be used for encoding data packets including more than two bytes, and the respective speed improvement is even more significant. FIG. 2 illustrates the encoding of a 32-bit data packet, wherein the solid lines indicate the encoding scheme (parallel encoding) of the present invention, while the dashed lines indicate conventional encoding schemes having series encoding.

It is realized that, as shown in solid lines, at the time byte[7:0], which includes bits 0 to 7, is encoded, the byte[15:8], which includes bits 8 to 15, may be encoded simultaneously. In addition, by indexing into the disparity table for the byte[7:0] and byte[15:8] (refer to blocks 24 and 29 in FIG. 1) whether the data[15:0] as a whole will balance the running disparity or not may be determined, and hence the encoding of byte[23:16] can be performed simultaneously with the encoding of byte[7:0] and byte[15:8]. For the same reason, byte[31:24] can be encoded simultaneously with the encoding of byte[7:0], byte[15:8], and byte[23:16].

In alternative embodiments, a look-ahead table may be made for 16-bit source data, wherein the first column of the look-ahead table shows all combinations of 16-bit source data. Therefore, the look-ahead table has 65,536 rows. The "balancing capability" column of the look-ahead table represents essentially the same meaning as in Table 1, except it now represents whether the 20-bit encoded data generated from the 16-bit source data has the ability to balance the running disparity or not. Correspondingly, the encoding of the byte

[23:16] may refer to the 16-bit look-ahead table to quickly determine whether data[15:0] has the ability to balance running disparity or not.

By using the embodiment shown in FIG. 2, the encoding time of the 32-bit data is close to the longest one for encoding the four bytes in the 32-bit data. As a comparison, as shown by dashed lines, the conventional encoding schemes require the four bytes in the 32-bit data to be encoded in series. The encoding time is thus close to the sum for encoding all four bytes. Experiment results have revealed that by using the embodiments of the present invention, the encoding speed of 4-byte data packets can be increased by about 78 percent. If the data packets include even more bytes, the encoding speed can be roughly increased by about (n−1)*26%, wherein the number n is the number of bytes in the data packets.

Figure 3:
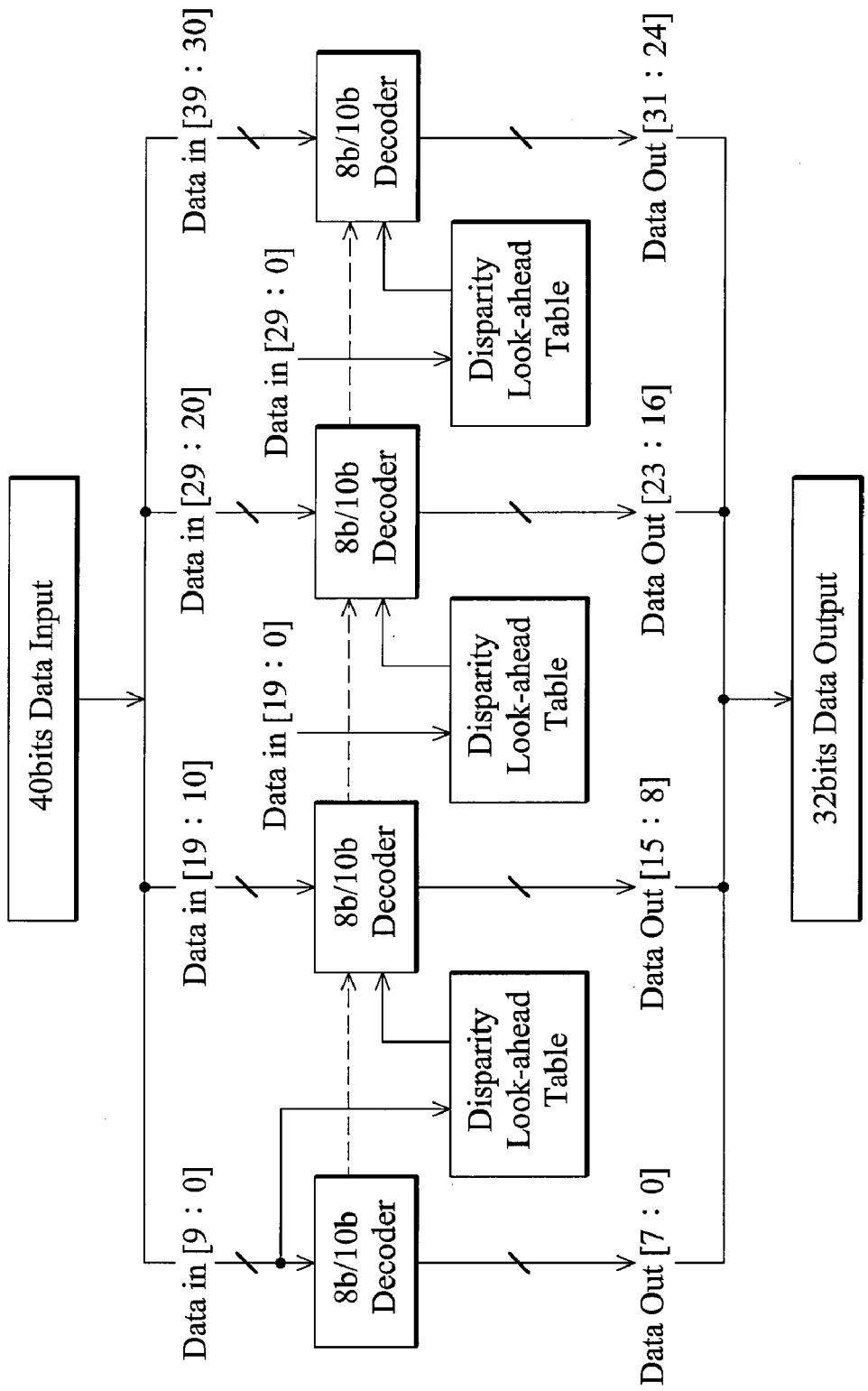
FIG. 3 illustrates an embodiment of the present invention, wherein four 10-bit encoded data units are decoded simultaneously.

FIG. 3 schematically illustrates a decoding scheme for decoding a 40-bit encoded data unit back to 32-bit data, wherein the solid lines indicate the decoding scheme of the present invention, while the dashed lines indicate conventional decoding schemes. It is realized the decoding is essentially the reverse operation of the encoding. Accordingly, the same concept used in the encoding can be used in the decoding. The 40-bit data are separated into four 10-bit data, and may be decoded in parallel. As a comparison, in conventional decoding schemes, the 10-bit data units are decoded in series. Again, simulation results have revealed that by using the embodiments of the present invention, the decoding speed can be increased by about 78 percent.

Although 8-bit encoding, which includes 3-bit encoding and 5-bit encoding, is used as an example, the concept of the present invention can be applied to the encoding of source data units including any number of bits. Also, the present invention may be applied to the encoding/decoding of both data packets and/or control data. Accordingly, the "data units" column in the look-ahead tables may represent data only, control bits only, or the combination of data and control bits.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for encoding data packets, the method comprising:
   providing an encoding scheme for coding source data units into encoded data units, wherein each of the encoded data units comprises more bits than the source data units, and wherein at least one of the source data units corresponds to at least two encoding choices having opposite disparities;
   establishing a first look-ahead table for the source data units;
   providing a data packet comprising a first source data unit and a second source data unit;
   encoding the first source data unit to generate a first encoded data unit;
   indexing the first look-ahead table using the first source data unit to determine a balancing capability of the first encoded data unit for balancing a running disparity; and
   encoding the second source data unit to generate a second encoded data unit using the balancing capability of the first encoded data unit.

2. The method of claim 1, wherein the steps of encoding the first and the second source data units are performed in parallel.

3. The method of claim 1, wherein the step of indexing the first look-ahead table using the first source data unit is performed before the first encoded data unit is generated.

4. The method of claim 1, wherein the first look-ahead table is pre-established before the step of encoding the first source data unit.

5. The method of claim 1, wherein the data packet further comprises a third source data unit, and wherein the method further comprises:
   indexing the first look-ahead table using the second source data unit to determine a balancing capability of the second encoded data unit for balancing the running disparity; and
   encoding the third source data unit to generate a third encoded data unit using the balancing capability of the second encoded data unit.

6. The method of claim 5, wherein the step of encoding the third source data unit is performed simultaneously with the steps of encoding the first and the second source data units.

7. The method of claim 5, wherein the step of indexing the first look-ahead table using the second source data unit is performed before the second encoded data unit is generated.

8. The method of claim 1, wherein the data packet further comprises a third source data unit, and wherein the method further comprises:
   establishing a second look-ahead table for data units having at least twice the number of bits as the source data units;
   indexing the second look-ahead table using a combined data unit to determine a balancing capability for balancing the running disparity, wherein the combined data unit comprises the first and the second source data units; and
   encoding the third source data unit to generate a third encoded data unit using the balancing capability of the combined data unit.

9. The method of claim 1, wherein the step of encoding the first source data unit comprises:
   separating the first source data unit into a first sub data unit and a second sub data unit;
   encoding the first sub data unit to generate a first sub encoded data unit;
   encoding the second sub data unit to generate a second sub encoded data unit; and
   combining the first and the second sub encoded data units to generate the first encoded data unit.

10. The method of claim 1 further comprising combining the first and the second encoded data units into an additional data packet.

11. A method for encoding data packets, the method comprising:
    providing an encoding scheme for 8b/10b encoding, wherein at least one 8-bit source data unit corresponds to two 10-bit encoding choices having opposite disparities;

establishing a first look-ahead table comprising 8-bit source data as a first column, wherein a second column of the first look-ahead table represents balancing capabilities of 10-bit encodings generated from the 8-bit source data;

providing a data packet comprising a first source byte and a second source byte;

encoding the first source byte to generate a first 10-bit encoded data unit;

indexing the first look-ahead table using the first source byte to determine a first balancing capability of the first 10-bit encoded data unit for balancing a running disparity;

before the step of encoding the first source byte is finished, encoding the second source byte to generate a second 10-bit encoded data unit using the running disparity and the first balancing capability; and combining the first and the second 10-bit encoded data units into an additional data packet.

12. The method of claim 11, wherein each of the steps of encoding the first and the second source bytes comprises selecting an encoding for balancing the running disparity from two 10-bit encodings having opposite disparities.

13. The method of claim 11, wherein the data packet further comprises a third source byte, and wherein the method further comprises:

indexing the first look-ahead table using the second source byte to determine a second balancing capability of the second 10-bit encoded data unit; and encoding the third source byte to generate a third 10-bit encoded data unit using the first and the second balancing capabilities.

14. The method of claim 13, wherein the step of encoding the third source byte is performed before the first and the second 10-bit encoded data units are generated.

15. The method of claim 11, wherein the data packet further comprises a third source byte, and wherein the method further comprises:

establishing a second look-ahead table for indexing two-byte data units;

indexing the second look-ahead table using a two-byte data unit comprising the first and the second source bytes to determine a third balancing capability of the first and the second 10-bit encoded data units; and encoding the third source byte to generate a third 10-bit encoded data unit using the third balancing capability.

16. The method of claim 11, wherein the step of encoding the first source byte comprises:

separating the first source byte into a 5-bit data unit and a 3-bit data unit;

encoding the 5-bit data unit to generate a 6-bit encoded data unit;

encoding the 3-bit data unit to generate a 4-bit encoded data unit; and combining the 6-bit encoded data unit and the 4-bit encoded data unit to generate the first 10-bit data unit.

17. The method of claim 16, wherein the step of encoding the 3-bit data unit comprises indexing a second look-ahead table comprising a column representing all 5-bit data, and an additional column representing balancing capabilities of 6-bit encoded data units generated from the 5-bit data.

18. A method for encoding data packets, the method comprising:

providing a running disparity;

providing a data packet comprising a first source byte and a second source byte;

encoding the first source byte to generate a first 10-bit encoded data unit;

pre-calculating balancing capabilities of all 10-bit data units;

storing the balancing capabilities in a look-ahead table;

predicting a balancing capability of the first 10-bit encoded data unit by indexing into the look-ahead table using the first source byte; and before the first 10-bit encoded data unit is generated, encoding the second source byte to generate a second 10-bit encoded data unit, wherein the step of encoding the first source byte is started before the first 10-bit encoded data unit is generated.

19. An encoding system comprising:

a first look-ahead table indexing source data units to balancing capabilities, wherein each of the balancing capabilities indicates a capability of an encoded data unit generated from a respective source data unit for balancing running disparities;

a first encoder configured to encode a first source data unit in a data packet to generate a first encoded data unit; and a second encoder configured to encode a second source data unit in the data packet to generate a second encoded data unit, wherein the second encoder is configured to index into the first look-ahead table using the first source data unit.

20. The encoding system of claim 19, wherein the first and the second encoders are configured to use an encoding scheme to encode the first and the second source data units, and wherein in the encoding scheme, at least one of the source data units corresponds to at least two encoding choices having opposite disparities.

21. The encoding system of claim 19, wherein the second encoder is configured to encode the second source data unit before the first encoded data unit is generated.

22. The encoding system of claim 19, wherein the first encoder comprises a first and a second sub encoder, each configured to encode a portion of the first source data unit.

23. The encoding system of claim 19 further comprising a third encoder configured to encode a third source data unit in the data packet to generate a third encoded data unit, wherein the third encoder is configured to index into the first look-ahead table using the second source data unit.

24. The encoding system of claim 23, wherein the third encoder is configured to encode the third source data unit before the first and the second encoded data units are generated.

25. The encoding system of claim 19 further comprising:

a second look-ahead table indexing additional data units to balancing capabilities of the data units, wherein each of the additional data units has twice the number of bits as the source data units; and a third encoder configured to encode a third source data unit in the data packet to generate a third encoded data unit, wherein the third encoder is configured to index into the second look-ahead table using the first and the second source data units in combination.

26. An encoding system comprising:

a look-ahead table indexing bytes to balancing capabilities;

a first 8b/10b encoder configured to encode a first source byte in a data packet to generate a first 10-bit encoded data unit, and to balance a running disparity; and a second 8b/10b encoder configured to encode a second source byte in the data packet to generate a second 10-bit encoded data unit, and to balance the running disparity, wherein the second 8b/10b encoder is configured to predict the running disparity by indexing the first source byte in the look-ahead table.

27. The encoding system of claim 26, wherein each of the first and the second 8b/10b encoders comprises a 3b/4b encoder and a 5b/6b encoder, each configured to encode a portion of a byte.

28. The encoding system of claim 27, wherein the 3b/4b encoder and the 5b/6b encoder are both configured to perform encoding without waiting for results of each other.

29. The encoding system of claim 26, wherein the second 8b/10b encoder is configured to encode the second source byte without knowing the first 10-bit encoded data unit, and wherein the first 8b/10b encoder is configured to encode the first source byte without knowing the second 10-bit encoded data unit.

30. The encoding system of claim 26 further comprising a third encoder configured to encode a third source byte in the data packet to generate a third 10-bit encoded data unit, wherein the third encoder is configured to index the second source byte from the look-ahead table.

31. The encoding system of claim 30, wherein the third encoder is configured to parallel encode the third source byte with the first and the second 8b/10b encoders.

32. The encoding system of claim 26 further comprising:
an additional look-ahead table for indexing 16-bit source data units to balancing capabilities; and
a third encoder configured to encode a third source byte in the data packet to generate a third 10-bit encoded data unit, wherein the third encoder is configured to index a 16-bit data unit combining the first and the second source bytes from the additional look-ahead table.

* * * * *